United States Patent [19]

Tucker

[11] Patent Number: 4,500,404
[45] Date of Patent: Feb. 19, 1985

[54] CHLORINE GENERATOR DEVICE

[76] Inventor: Daniel Tucker, 1981 Chateau Ct., Walnut Creek, Calif. 94598

[21] Appl. No.: 332,957

[22] Filed: Dec. 21, 1981

[51] Int. Cl.³ .................... C25G 1/34; C25G 15/02
[52] U.S. Cl. ................................. 204/266; 204/263; 210/263; 210/267
[58] Field of Search .............. 204/98, 128, 257, 258, 204/95, 263-266, 210/169, 263, 287

[56] References Cited

U.S. PATENT DOCUMENTS

| | | | |
|---|---|---|---|
| 2,882,210 | 4/1959 | Jenks | 204/128 |
| 3,351,542 | 11/1967 | Oldershaw et al. | 204/128 |
| 3,640,804 | 2/1972 | Westerlund | 204/95 |
| 3,928,165 | 12/1975 | Piester | 204/266 |
| 4,242,185 | 12/1980 | McRae | 204/98 |
| 4,256,552 | 3/1981 | Sweeny | 204/98 |
| 4,337,136 | 6/1982 | Dahlgren | 210/169 |

Primary Examiner—R. L. Andrews
Attorney, Agent, or Firm—Roger A. Marrs

[57] ABSTRACT

A chlorine generating apparatus is disclosed herein by which chlorine gas or sodium hyperchlorite is generated in small quantities from a brine solution economically enough to be practical for use in the backyard swimming pool. The apparatus includes a free standing unit and cell utilizing only salt as its raw material to generate the chlorine required. The chlorine generating cell incorporates a chemical pump for forciably urging the resulting product to the pool without the use of mechanical pumps or membranes. A device is included whereby hardness minerals are prevented from being deposited within the cell.

3 Claims, 3 Drawing Figures

CHLORINE GENERATOR DEVICE

BACKGROUND OF THE INVENTION

1. Field of the Invention

The present invention relates to an apparatus and method for generating sodium hyperchlorite and/or chlorine gas from a brine solution in small quantities to be suitable and economical for backyard swimming pool use. The concept can also be expanded for larger commercial installations. The purpose of the invention is to replace the need to haul dangerous, toxic and poisonous chemicals from a store to the pool owner's home, store them where they might accidentally cause damage or loss of human life, and eliminate the need to continuously dispense these chemicals in uncertain proportions into the swimming pool.

2. Brief Description of the Prior Art

It is a well known fact that for a swimming pool to be used safely the water must be sterile. In addition, if proper disinfectant or algaeside is not applied, the growth of algae will damage the pool surface and clog the pool filters. More often than not, the home swimming pool is a breeding ground for disease. Several current methods of chlorinating the home swimming pool are now in use.

One method is the adding of liquid chlorine, normally a diluted solution of sodiumhyperchlorite. This is carried from the store in gallon bottles and dispensed manually by the user.

Another method is the use of powdered chlorine chemicals which may be added by hand or dispensed through a means of a hopper or supplied in stick form which slowly dissolves into the pool water either in a dispenser container or in some sort of floating element that rides on the pool surface.

Yet another method which is becoming more popular even though it presents the greatest hazards, is the use of gas chlorine. Normally, a service man chlorinates the pool once a week by dispensing chlorine gas into the water and adding soda ash or some equivalent base to counteract the acid induced by the chlorine. Since the dispensing of the chlorine gas is done infrequently, i.e. once per week, the chlorine level is raised to a very high point at that time so that it will not drop below the required to maintain proper pool function within a weeks time. This very high initial concentration of chlorine in the water adversely affects swimmer's tans and bleaches hair as well as bathing suits.

In all these instances, caustic chemicals must be transported to the pool site and many cases of bottled or boxed chemicals are left stored where they can be accidentally reached by children.

Many prior attempts have been made to generate the chlorine at the pool site. The most common of these utilize salt within the pool water itself and bypasses a small portion of the filter flow through an electrolysis cell which generates the chlorine. This prior system has not been satisfactory due to the continuous problem of the hardness minerals within the pool water precipitating and eventually clogging and damaging the cell. A number of methods have been employed by which this hardness could be removed through acid washing of the cell between pool use. However, this procedure requires complex automatic equipment or manual operation by the pool owner. In the former case, the equipment is too elaborate and complex to be practical for the home use application. In the latter case, the pool owner often as not would forget to operate the equipment and the cell would be destroyed. The problem is further compounded by the large amount of salt that has to be added to the pool water bringing the salitity content to the point where corrosion and electrolysis in the pool's plumbing system were often out of control.

Another objection to previous units is the amount of electricity required to operate the electrolysis cell since the salt concentration within the cell had to be kept low usually less than 0.25%. A great deal of the electrical energy went into the production of hydrogen and oxygen, a wasteful by-product in this application. With the cost of energy steadily increasing, this method of production is simply not cost effective.

SUMMARY OF THE INVENTION

These and other objectives are achieved in accordance with the present invention by providing a tank in which a concentrated brine solution is maintained. Tap water, noticibly softer than pool water, is drawn directly through a water softening means removing all of the hardness elements before it is presented to an electrolysis cell which is located submerged within the brine solution. The electrolysis cell is separated into two sections by an ion selective membrane. One section contains the cathode, the other the anode. The ion selective membrane will pass only sodium and hydrogen ions which flow from the anode to the cathode side of the cell. Sodium hydroxide and hydrogen are generated in the cathode side of the membrane and chlorine gas is generated on the anode side of the membrane. The water that supplies the cathode side is drawn from the output of the water softener directly such that salt is not consumed on the cathode side. Water is drawn for the anode side from the bottom of the brine tank where maximum concentration of brine can be obtained. The generation of the gas bubbles, within the cell, chlorine anode side and hydrogen cathode side, produces a pumping action to drive the water out of the cell. The anode output enters a unique dewatering device where the chlorine gas is separated from the brine solution which is then returned to the bottom of the tank. The chlorine gas then enters a manifold where it combines with the hydroxide solution from the cathode side and is dispensed to the swimming pool in the form of sodium hyperchlorite, the most appropriate sterilizing means available.

The electrolysis within the cell is accomplished by passing current through the cell which is generated by a power supply that forms an intrigal part of the apparatus.

By generating sterilizing media in situ on a continuous basis, the invention also provides sanitation and protection far in excess of that normally afforded in home pool usage. Operation of the invention is easily understood and the unit may be rapidly installed by moderately skilled labor and operated by the normal unskilled homeowner. It is among the primary objects of this invention to provide a device which develops chlorine and its sterilizing by-products directly from a concentrated brine solution and to dispense them into a swimming pool for sterilization purposes.

It is the further object of this invention to make such dispensation in a steady and consistent manner in order to maintain proper sterility at all times.

It is yet another object of this invention to control the PH of the pool water for comfortable swimming and effective sterilization at all times as well as preventing undue attack on the pool's plumbing system.

It is yet still another object of this invention to do this in such a manner as to draw only a small amount of electrical power and to make the entire process cost effective in comparison with other methods of pool chlorination.

Another object of this invention is to accomplish all of the above objects in an automatic manner which requires a minimum of maintenance and skill on the part of the owner and operator.

Yet another object of the present invention is to provide a novel means for adjusting the PH of the pool water either up or down a scale within a desirable range.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

The following detailed description is of the best presently contemplated modes of carrying out the invention. This description is not to be taken in a limiting sense but is made merely for the purpose of illustrating the general principles of the invention since the scope of the invention best is defined by the appended claims.

Figure 1:
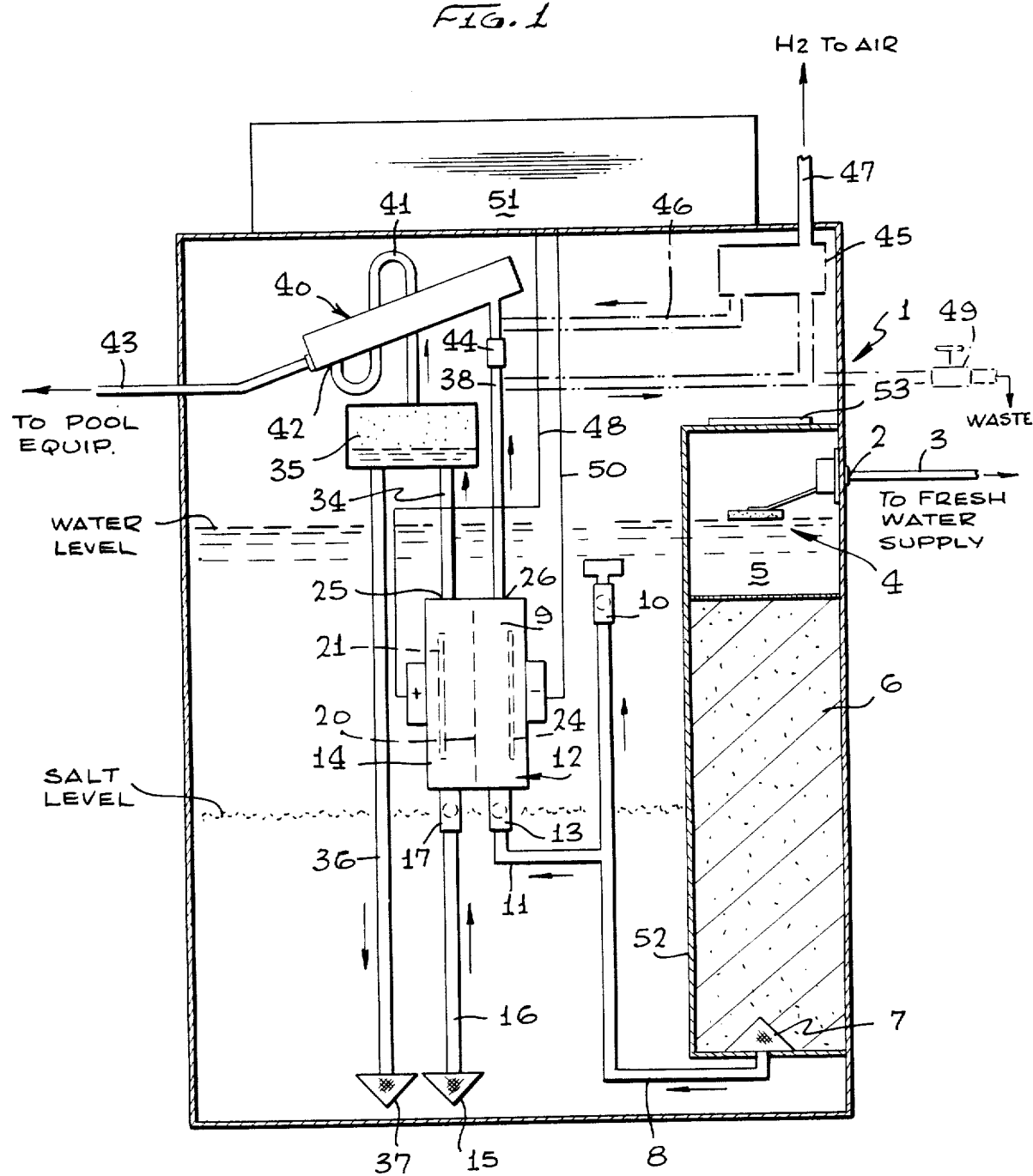
FIG. 1 depicts a block diagram showing the basic components of the system and their interconnections incorporating the present invention.

Referring now to FIG. 1, it can be seen that fresh water enters a generating device 1 which incorporates the present invention at inlet 2 through line 3 which is connected to a fresh tap water supply. A float valve 4 maintains the water level in a chamber 5 above a quantity of softening resin 6 at the proper level. Water flows through the softening resin, where the hardness ions are exchanged with hydrogen or sodium ions, and passes through a screen 7 via a tube 8 into the main water chamber of the generator unit 1 through a check valve 10. The fresh softened water is also fed through a by-pass tube 11 into the cathode side 9 of a conversion cell 12. By using the softened tap water to flow through the cathode side of the cell, the amount of brine water needed for the operation is greatly reduced. The fresh water flows into cell 12 from tube 11 through a check valve 13.

Figure 2:
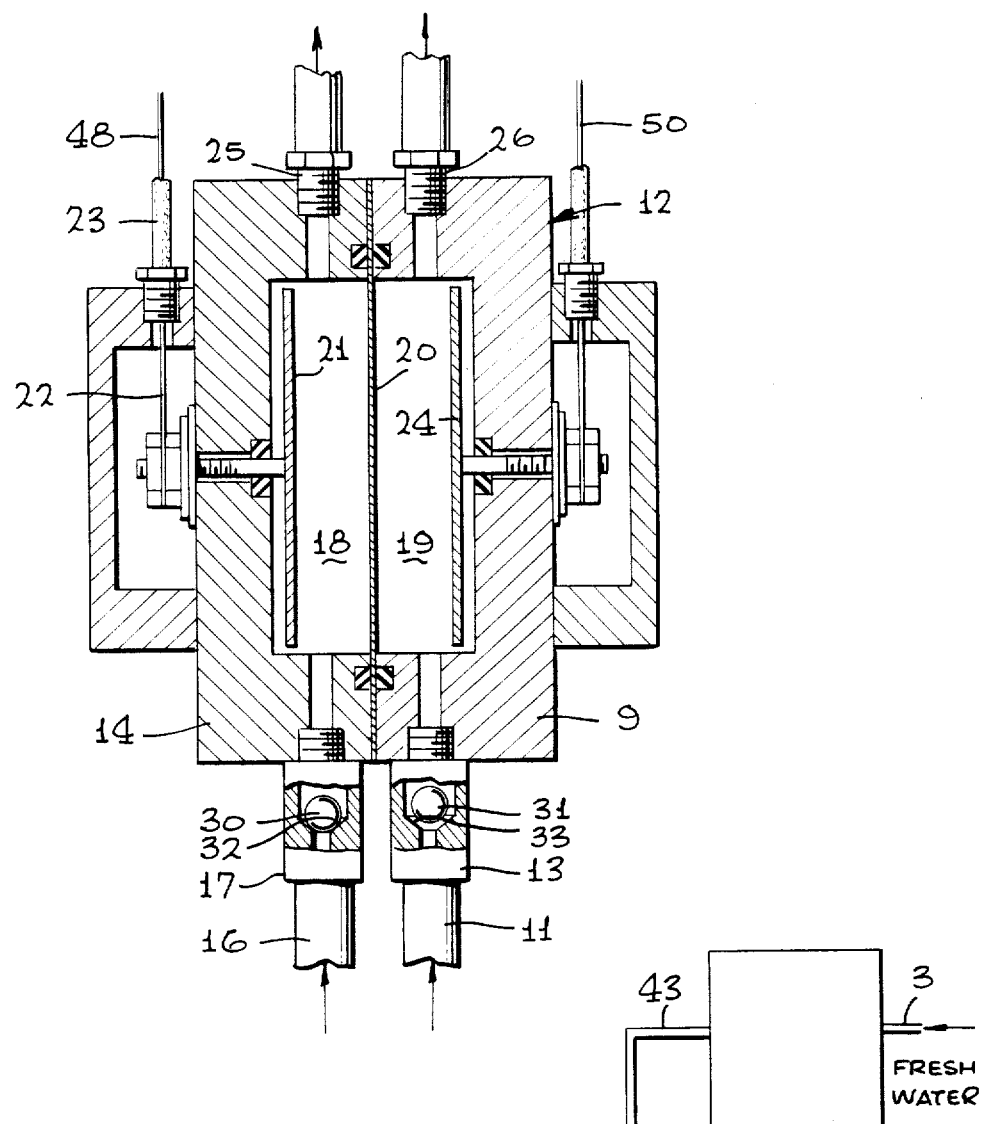
FIG. 2 indicates a diagram of the unique electrolysis cell and its appropriate functions.

A detailed view of the conversion cell is shown in FIG. 2. The electrolysis process operates as follows: Brine water for the anode side 14 of cell 12 is brought from the bottom of the tank through a screen 15, a tube 16, and a check valve 17 into the anode compartment 18. The anode and cathode sections of the cell are separated by a selective ion membrane 20. This membrane passes only the sodium and hydrogen ions. A positive direct current source is connected to an anode 21 in the anode compartment through an electrical lead 22 attached at the outside of the cell. This lead follows through a sealed tube 23 to a power supply 51 that supplies the DC current.

The anode is in contact with the chlorine ions from the sodium chloride solution and converts them to chlorine gas. The positive charged sodium ions pass through membrane 20 into the cathode compartment 19 as they are attracted by a negative charged cathode 24 which is connected to the source of DC power 51 in the same manner as anode 21. When the sodium ions reach the cathode they are converted to sodium which immediately reacts with the water to form sodium hydroxide liberating hydrogen gas at the cathode. Thus, the anode compartment 18 is filled with brine solution and chlorine gas and the cathode compartment 19 is filled with sodium hydroxide liquid and hydrogen gas.

As the gases are formed, they force the liquid out of the cells through a pair of output ports 25 and 26. As the liquid is forced out of the cells by the gas, the gas goes with it. As soon as the cell is partially empty, more liquid enters through check valves 13 and 17. The checking action is caused by the plastic balls 30 and 31 which normally rest on the respective valve seats 32 and 33. Since the cell is operated under water, the water will flow into the cell by moving the ball aside; however, once the gas starts to form creating an upward thrust on the liquid through the output ports, the balls are forced to their seats. This novel method of pumping avoids the need or use of pumps of a mechanical nature normally associated with chlorine generating equipment.

Since the cell is submerged, the pumping action will still take place without the use of the check valves 13 and 17 but, with the check valves, the action is much more reliable and will work against a greater head pressure.

In other conventional chlorine generating systems, more liquid must be passed through the cell to keep it cool, since substantial heat is generated by the electrolysis process. By operating the cell submerged in the brine solution, cooling is accomplished without the wasteful consumption of salt or overworking the softening resin.

The current to the cell is supped via wire 48 for the positive anode and 50 for the negative cathode from the souce of direct current and voltage 51 mounted on top of the generator tank device or assembly 1.

The amount of softening resin 6 stored in resin tank 52 is adequate for operating a standard backyard swimming pool for a full season without recharging, i.e., removing the hardness salts from the resin and replacing them with hydrogen ions such that is can continue to perform its softening task with conventional water softeners. This is normally accomplished by running a salt solution through the resin and then flushing it to wash with fresh water. In order to save on the need for the various valves and fittings required to accomplish this, as well as the extensive instructions to the pool owner, a novel means by which this is done has been developed. Chlorinating the pool with this chlorinator would normally cause the maintenance of a neutral PH since both the product of the anode side and the cathode side of the cell are put into the water. However, a small portion of the chlorine gas will escape to atmosphere causing the pool to move slightly to the alkaline side. This necessitates that the pool owner add a small amount of acid occasionally to the pool. As an alternative, a valve 49 connected to the cathode output line 38 may manually or automatically send base product to waste bringing the PH to neutral. The resin and float assembly 4 and 52 has been constructed with a lid 53. When salt is added to the unit, the owner is instructed to remove lid 53 and fill the chamber with hydrochloric acid. This acid washes through the resin in place of the fresh tap water and in so doing replaces the hardness ions with hydrogen ions rather than sodium ions. This does not impair the softening capability of the resin whatsoever. In fact, during softening, it is replacing the hardness ions in the incoming water with hydrogen ions thus not only softening but purifying the water.

The main need for softeninh is that, without the softening action, the positively charged hardness ions, mostly calcium and magnesium, will be caused to precipitate in the cathode side of the cell, clogging and destroying it. This deposition will not happen if the hardness ions are washed through the cell in an acid media. In addition, the acid passing through the cell will clean up any hardness ions that may have escaped the softening resin and deposited in the cell. Thus, this method of recharging the softening resin also cleans the system. The acid then ends up in the pool water bringing the PH into balance, accomplishing a third advantage of this method of resin recycling.

Figure 3:
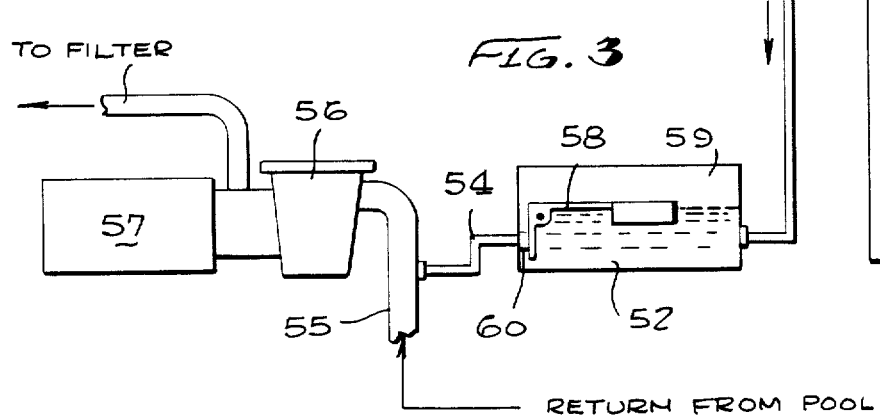
FIG. 3 typically illustrates a connection to a swimming pool.

Referring not to FIG. 3, chlorine generator unit 1 is connected between the fresh incoming water supply through tube 3 and output tube 43. Tube 43 connects to a control unit 59. The output of unit 59 is fed through tube 54 to the vacuum return line from the swimming pool 55 where it is drawn into the normal pool filtering system, a portion of which is shown as a debris pot 56 and a pump and motor assembly 57.

The pool equipment is normally located above the water line. When the motor is shut off, a means must be provided to prevent the pump from losing its prime by drawing air through the tube 54. As shown in FIG. 3, the float assembly 58 acts to close the port 60 when the level of fluid in the container 59 has been drawn down to a predetermined level. This assumres that no air will ever be drawn into the pump recirculating system whether off or running.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A chlorine generating device comprising;
   a tank containing a saturated solution of sodium chloride; an electrolytic cell submerged therein;
   said cell containing an ion selective membrane separating anode and cathode compartments such that a brine solution is present only on said anode compartment of said cell;
   a water softening means to supply hardness free water to make up said brine solution as well as to be directly supplied to said cathode compartment of said cell; and
   a source of direct current, the positive output thereof connected to an anode electrode of said cell and the negative output to a cathode electrode of said cell.

2. A chlorine generating device according to claim 1 wherein:
   said cell operates as its own pumping device by means of the gas generated therein causing the liquid from each chamber to be properly expelled.

3. A chlorine generating device according to claim 2 wherein:
   a check valve is incorporated at the input of either or both of said cathode or anode compartments of said cell to facilitate one way fluid flow in said pumping action of said cell.

* * * * *